(12) United States Patent
Oh et al.

(10) Patent No.: US 8,379,910 B2
(45) Date of Patent: Feb. 19, 2013

(54) IMAGE SIGNATURE CREATING METHOD AND APPARATUS FOR DISCRIMINATING STILL IMAGES

(75) Inventors: Weon Geun Oh, Daejeon (KR); A Young Cho, Daejeon (KR); Ik Hwan Cho, Daejeon (KR); Ju Kyoung Jin, Daejeon (KR); Won Keun Yang, Daejeon (KR); Jun Woo Lee, Daejeon (KR); Dong Seok Jeong, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 577 days.

(21) Appl. No.: 12/664,041

(22) PCT Filed: Jun. 18, 2008

(86) PCT No.: PCT/KR2008/003431
§ 371 (c)(1),
(2), (4) Date: Dec. 10, 2009

(87) PCT Pub. No.: WO2009/005228
PCT Pub. Date: Jan. 8, 2009

(65) Prior Publication Data
US 2010/0183189 A1    Jul. 22, 2010

(30) Foreign Application Priority Data

Jun. 29, 2007   (KR) .................. 10-2007-0064988
Mar. 27, 2008   (KR) .................. 10-2008-0028478

(51) Int. Cl.
*G06K 9/00*   (2006.01)
*G06K 9/48*   (2006.01)
(52) U.S. Cl. ...................................... 382/100; 382/199

(58) Field of Classification Search .................. None
See application file for complete search history.

(56) References Cited

U.S. PATENT DOCUMENTS
2008/0240574 A1   10/2008   Weon Geun et al.

FOREIGN PATENT DOCUMENTS
| JP | 8-504979 | 5/1996 |
|---|---|---|
| KR | 10-2002-0070113 A | 9/2002 |
| KR | 10-20070042511 A | 4/2007 |
| KR | 10-2008-0088778 A | 10/2008 |
| KR | 10-2009-0000762 A | 1/2009 |
| WO | WO 2005/124681 A1 | 12/2005 |
| WO | WO 2008/060022 A1 | 5/2008 |

OTHER PUBLICATIONS

Oh, Weon-Geun et al., "New Proposal and Performance Results for MPEG-7 VCE-6 Basic Conditions," MPEG Doc. No. M14523, Apr. 2007.*

(Continued)

*Primary Examiner* — Barry Drennan
*Assistant Examiner* — Andrew Moyer
(74) *Attorney, Agent, or Firm* — Blakely, Sokoloff, Taylor & Zafman

(57) ABSTRACT

An image signature creating method includes: creating a map by partitioning a still image using rings defined by concentric circles radially spaced apart from each other by a predetermined interval and radial lines circumferentially spaced apart from each other by a predetermined angle, the center of the still image being that of the concentric circles; and creating an image signature from the created map on the basis of distribution of pixels in regions defined by the rings and the radial lines. Accordingly, distribution of illegal contents is prevented and interrupted by search for and discrimination of a still image illegally deformed by a copying of or an intended attack on the still image.

12 Claims, 4 Drawing Sheets

300

305

OTHER PUBLICATIONS

Oh, Weon-Geun et al., "Coding of Moving Pictures and Associated Audio," ISO/IEC JTC1/SC29/WG11, MPEG07/M 14618, International Organization for Standardization, Lausanne, Switzerland, Jul. 2007.*

Oh, Weon-Geun, at al., "Coding of Moving Pictures and Associated Audio," *ISO/IEC JTC1/SC29/WG11*, MPEG07/M 14618, International Organization for Standardization, Lausanne, Switzerland, Jul. 2007.

* cited by examiner 1 1 0 1 0 0 0 1 1 1 1 0 0 0

IMAGE SIGNATURE CREATING METHOD AND APPARATUS FOR DISCRIMINATING STILL IMAGES

The present patent application is a non-provisional claiming the benefit of Application No. PCT/KR2008/003431, filed Jun. 18, 2008.

CROSS REFERENCE(S) TO THE RELATED APPLICATIONS

The present invention claims priority of Korean Patent Applications No. 10-2007-0064988 filed on Jun. 29, 2007 and No. 10-2008-0028478 filed on Mar. 27, 2008, which are incorporated herein by reference.

TECHNICAL FIELD

The present invention relates to a method and an apparatus for discriminating a still image even when the still image is deformed due to a copying of or an intended attack on the still image or, by the Internet or types of reproduction devices, and more particularly to an image signature creating method and an image signature creating apparatus for discriminating a still image that enable creation of a natural signature of the still image by partitioning the still image into regions using concentric circles and describing relations between the characteristics of the regions.

This work was supported by the IT R&D program of MIC/IITA [2007-P10-16, Development of Standards for Digital Rights Management].

BACKGROUND ART

Due to gradual increase in demands on digital contents, an enormous amount of multimedia contents such as videos, music, and images are being continuously produced, manufactured, distributed, and serviced. Among them, use of digital still images (hereinafter, referred to as 'still images') is explosively increasing due to supply of portable digital cameras, mass storage units, and portable storage mediums, and their low prices. Accordingly, demands on products for searching for the still image if necessary and discriminating it from another one are gradually increasing. This technology is referred to as a still image search technology.

Until now, technologies for searching still images have been mainly based on meta data (keywords) or contents of the still images. The technologies utilize pre-input information or natural information contained in an original still image, such as a color and a texture of the still image, and are very useful in searching for the undeformed original still image.

However, in the above-mentioned conventional technologies for searching for a still image, when the still image is illegally deformed due to a copying thereof or an intended attack thereon, or when a natural characteristic of the still image is deformed by the Internet or types of reproduction devices, natural information itself contained in the still image may not be utilized.

DISCLOSURE OF INVENTION

Technical Problem

It is, therefore, an object of the present invention to provide an image signature creating method and an image signature creating apparatus for discriminating a still image that enable discrimination of a still image deformed due to a copying of or an intended attack on the still image, or by the Internet or types of reproduction devices.

Another object of the present invention is to provide an image signature creating method and an image signature creating apparatus for discriminating a still image that enable search and discrimination of a still image even when the still image is illegally deformed due to a copying of or an intended attack on the still image or a natural characteristic of the still image, such as the size, form, and quality of the still image, is deformed by the Internet or types of reproduction devices.

Still another object of the present invention is to provide an image signature creating method and an image signature creating apparatus for discriminating a still image that enable creation of a natural signature of a deformed still image by partitioning the still image into regions using concentric circles and describing relations between the characteristics of the regions.

Technical Solution

In accordance with a first aspect of the present invention, there is provided an image signature creating method including:

creating a map by partitioning a still image using rings defined by concentric circles radially spaced apart from each other by a predetermined interval and radial lines circumferentially spaced apart from each other by a predetermined angle, the center of the still image being that of the concentric circles; and creating an image signature from the created map on the basis of distribution of pixels in regions defined by the rings and the radial lines.

In accordance with a second aspect of the present invention, there is provided an image signature creating apparatus including:

a map creating unit for creating a map by partitioning a still image using rings defined by concentric circles radially spaced apart from each other by a predetermined radial interval and radial lines circumferentially spaced apart from each other by a predetermined angle, the center of the still image being that of the concentric circles; and an image signature creating unit for creating an image signature from the created map on the basis of distribution of pixels in regions defined by the rings and the radial lines.

In accordance with a third aspect of the present invention, there is provided an image signature matching method for discriminating identities of first and second still images, the image signature matching method including:

creating a map by partitioning the first and second still images, using rings defined by concentric circles radially spaced apart from each other a predetermined interval and radial lines circumferentially spaced apart from each other by a predetermined angle respectively, the center of the first and second still images being that of the concentric circles;

creating image signatures of the first and second still images from the created map on the basis of distribution of pixels in regions defined by the rings and radial lines of the first and second still images; and checking whether or not the image signatures are matched each other by calculating an average Hamming distance between the image signatures of the first and second still images.

BEST MODE FOR CARRYING OUT THE INVENTION

The present invention creates a natural signature of a still image by partitioning the still image into regions using concentric circles and describing relations between the characteristics of the regions so that a still image deformed due to a copying thereof or an intended attack thereon, or a still image deformed in a natural characteristic of the still image, such as the size, form, and quality of the still image by the Internet or types of reproduction devices can be searched for and discriminated.

Still image discriminating technology based on the concentric circle partition based in accordance with the present invention is as follows.

A still image is partitioned using concentric circles prior to extracting characteristics from the still image, and then the characteristics are obtained from the partitioned still images. The center of the still image coincides with the center of the concentric circles, which are radially spaced apart from each other by a predetermined interval. Then, the still images partitioned using the concentric circles are partitioned by radial lines circumferentially spaced apart from each other by a predetermined angle again. An image signature obtained finally consists of bit strings of a predetermined length regardless of the size of the still image, showing a high efficiency in and matching speed.

The final image signature is created by integrating four characteristics into one, and all the characteristics are obtained from regions obtained using the concentric circles and the radial lines. The four characteristics include an average distribution of pixels in the rings, a primary difference distribution of the pixel value distributions, a secondary difference distribution of the pixel value distributions, and an angular difference distribution per one ring. One characteristic value is calculated per one ring from the innermost ring to the outermost ring, and then a distribution of the characteristic values is obtained. The obtained characteristic value is converted into a bit string by using a simple hash function. One bit is allocated to each ring, and four bits are applied to for each four characteristics on the average.

Hereinafter, the operational principle of the present invention will be described in detail with reference to the accompanying drawings.

Figure 1:
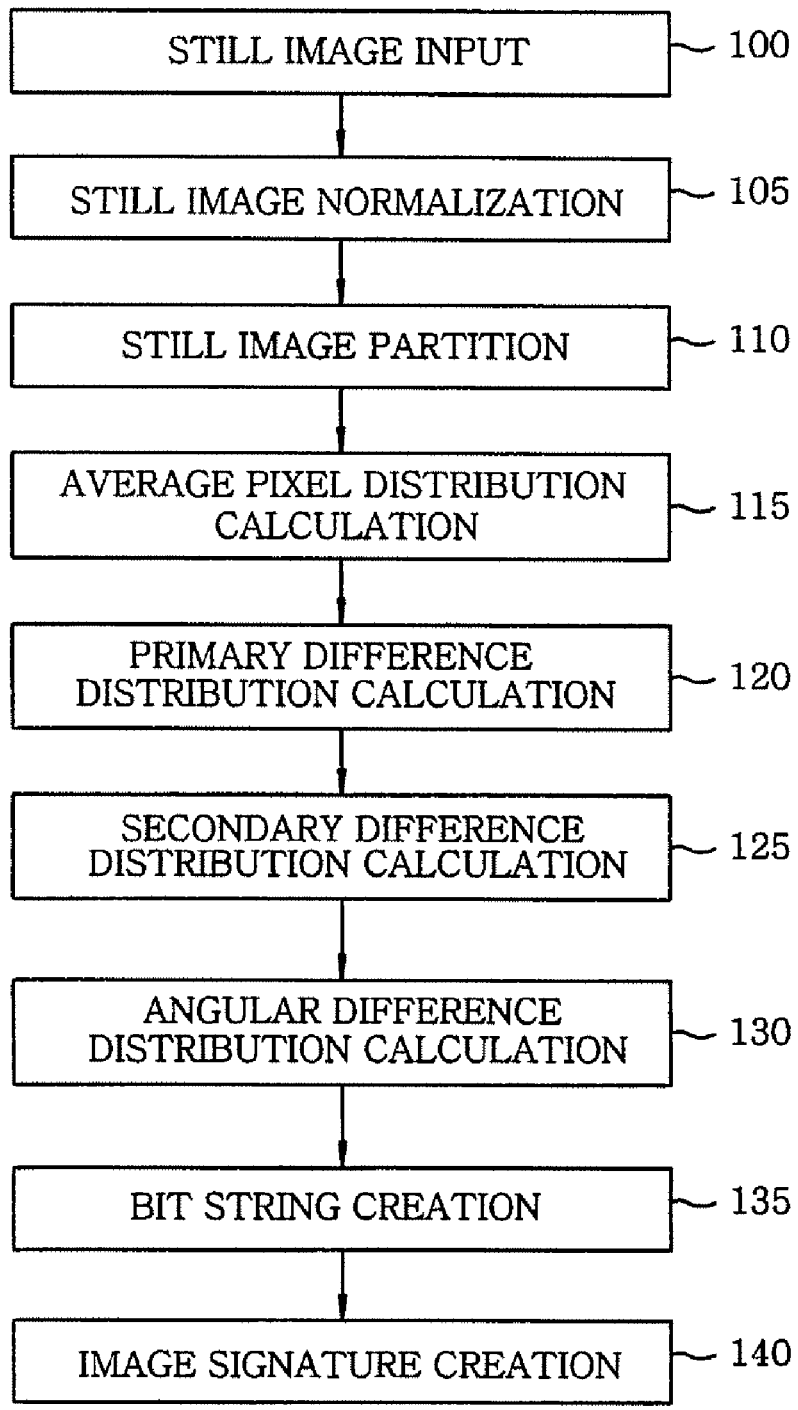
FIG. 1 is a functional block diagram of an image signature creating apparatus for discriminating a still image based on a concentric circle partition in accordance with an embodiment of the present invention.

FIG. 1 is a function block diagram of an image signature creating apparatus for discriminating a still image based on a concentric circle partition in accordance with an embodiment of the present invention.

With reference to FIG. 1, an image signature creating apparatus 150 for discriminating a still image includes a still image input unit 100, a still image normalization unit 105 normalizing the pixel size of the still image in correspondence to a predetermined pixel size, a still image partitioning unit 110 partitioning the normalized still image into regions, an average pixel distribution calculating unit 115 calculating average distributions of pixels in rings, each ring containing a predetermined number of regions, a primary difference distribution calculating unit 120 calculating a primary difference distribution of the calculated average pixels, a second difference distribution calculating unit 125 calculating a secondary difference distribution of the calculated average pixels, an angular difference distribution calculating unit 130 calculating a distribution between a first region in a ring and a second region counterclockwise adjacent to the first region in the ring, a bit string creating unit 135 converting the calculated distributions into bit strings using a hash function, and an image signature creating unit 140 creating an concentric circle partition based image signature.

More specifically, the still image input unit 100 transfers image data for the still image to the normalization unit 105, and the normalization unit 105 adjusts the still image to have a predetermined number of pixels, e.g. 256 pixels, on the basis of the shorter one of the width and height of the still image transferred from the still image input unit 100.

Figure 2:
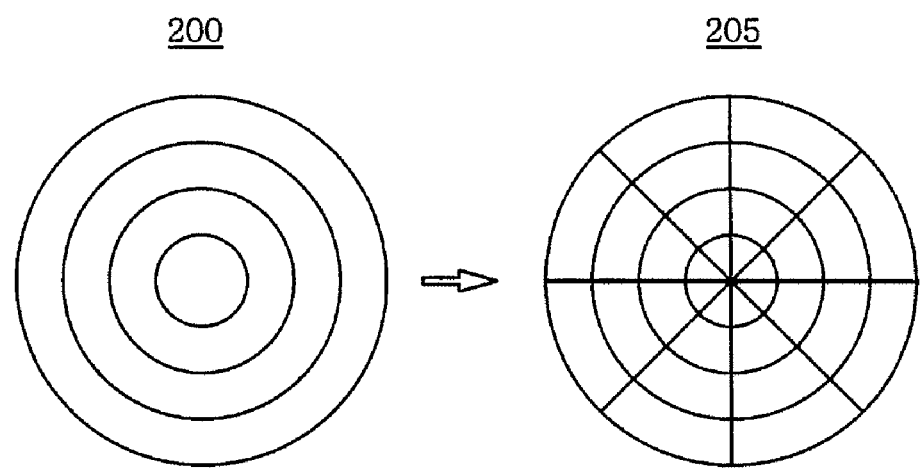
FIG. 2 is a view illustrating a map created by partitioning a still image into regions, using concentric circles radially spaced apart from each other by a predetermined interval and radial lines circumferentially spaced apart from each other by a predetermined angle in accordance with an embodiment of the present invention.
Figure 3:
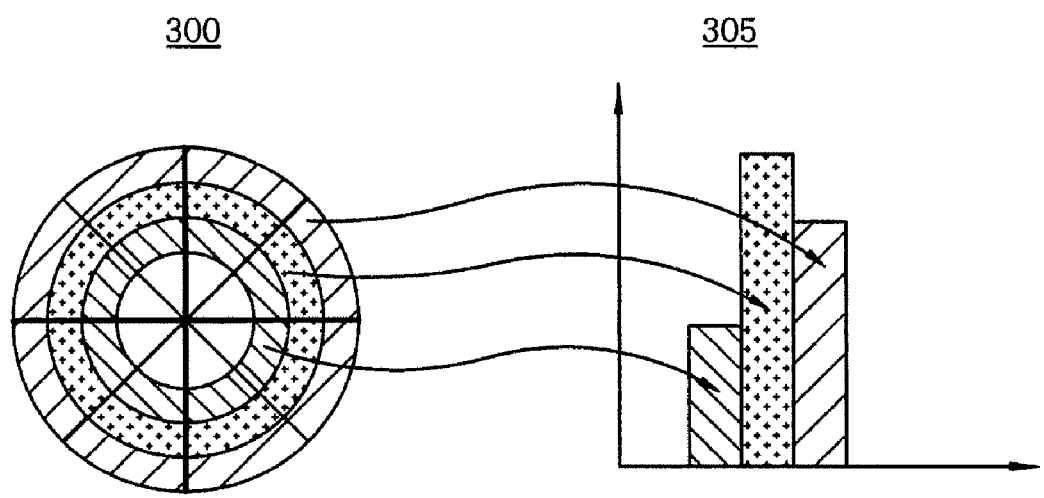
FIG. 3 is a view illustrating a method of calculating an average pixel distribution in accordance with an embodiment of the present invention.

As depicted in the reference numeral 200 of FIG. 2, the still image partitioning unit 110 partitions the still image into rings using concentric circles disposed at a predetermined radial interval, with the center of the still image being that of the concentric circles. Then, as depicted in the reference numeral 205, the still image partitioned into the rings is partitioned into regions, using radial lines intersecting the concentric circles by a predetermined angle.

For example, when the still image normalization unit 105 normalizes the pixels of the still image to 256 pixels, the still image partitioning unit 110 partitions the still image to create a map in which the diameter of the concentric circle is 256 pixels, the number of rings is 32, and the angle interval is 10 degrees.

Then, actual pixel values corresponding to pixels in the map are extracted from an original still image to finish the map. Bilinear interpolation is used to extract the pixel values from the still image of the original still image, and the center of the concentric circles coincide with that of the still image. After all the pixel values in the partitioned regions are obtained, average values of the pixels of the regions are calculated and are allocated to the corresponding regions.

The average pixel distribution calculating unit 115 calculates an average of the averaged pixel values of all regions in each ring through following Equation 1 and allocates the average to the corresponding ring.

MathFigure 1

$$F_{1,j} = \sum_{j=0}^{D} P_{i,j} \qquad \text{[Math. 1]}$$

where, $P_{i,j}$ is an average pixel value for a region of the i-th ring and the j-th angle and D is the number of all angular sections.

The primary difference distribution calculating unit 120 calculates a distribution of the absolute values of differences of the calculated average distributions of pixels in the adjacent rings that are obtained by the average pixel distribution calculating unit 115, using Equation 2.

MathFigure 2

$$F_{2,i} = abs(F_{1,i+1} - F_{1,i}) \quad [\text{Math.2}]$$

where, $F_{1,i}$ is an average pixel value of the i-th ring.

The secondary difference distribution calculating unit 123 calculates a distribution of the absolute values of differences of the calculated average distributions of pixels in the adjacent rings that are obtained by the primary difference distribution calculating unit 120. Difference distribution calculations are performed to the primary differences obtained in the primary difference distribution calculating unit 120, using Equation 3.

MathFigure 3

$$F_{3,i} = abs(F_{2,i+1} - F_{2,i}) \quad [\text{Math.3}]$$

where, $F_{2,i}$ is an average pixel value of the i-th ring.

Figure 4:
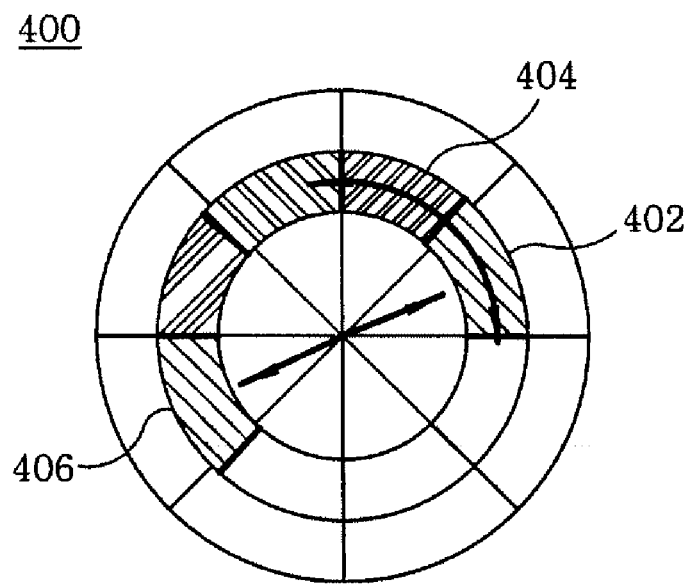
FIG. 4 is a view illustrating a method of calculating an angular difference distribution in accordance with an embodiment of the present invention.

As depicted in the reference numeral 400 of FIG. 4, the angular difference distribution calculating unit 130 multiplies the absolute value of an average of pixel differences between a first region 402 in an i-th ring and a second region 404 counterclockwise adjacent to the first region in the i-th ring by the absolute value of an average of pixel differences between the first region 402 and a third region 406 symmetrically opposite to the first region in the ring. An average of the values calculated for all the regions in the above-mentioned way becomes a value for the corresponding ring. The value is obtained for each ring to calculate a difference distribution, using Equation 4.

MathFigure 4

$$F_{4,i} = \sum_{j=0}^{angelLevel-1} abs(C_{i,j} - C_{i,(j+1)modeangleLevel}) \times abs(C_{i,j} - C_{i,j+angleLevel/2}) \quad [\text{Math. 4}]$$

where, $C_{i,j}$ is an average pixel value in a region of the i-th ring and the j-th angle and the angleLevel is the number of angles by which one ring is partitioned. That is, 10 degrees partitions a circle into 36 sections.

The bit string creating unit 135 converts the distributions calculated by the average pixel distribution calculating unit 115, the primary difference distribution calculating unit 120, the secondary difference distribution calculating unit 125, and the angular difference distribution calculating unit 130 into bit string, using a hash function. The used hash function is expressed in Equation 5.

MathFigure 5

$$B_i = \begin{cases} 1, & M_{i+1} > M_i \\ 0, & M \leq M_i \end{cases} \quad [\text{Math. 5}]$$

where, $M_i$ is the i-th value of the distributions.

Figure 5:
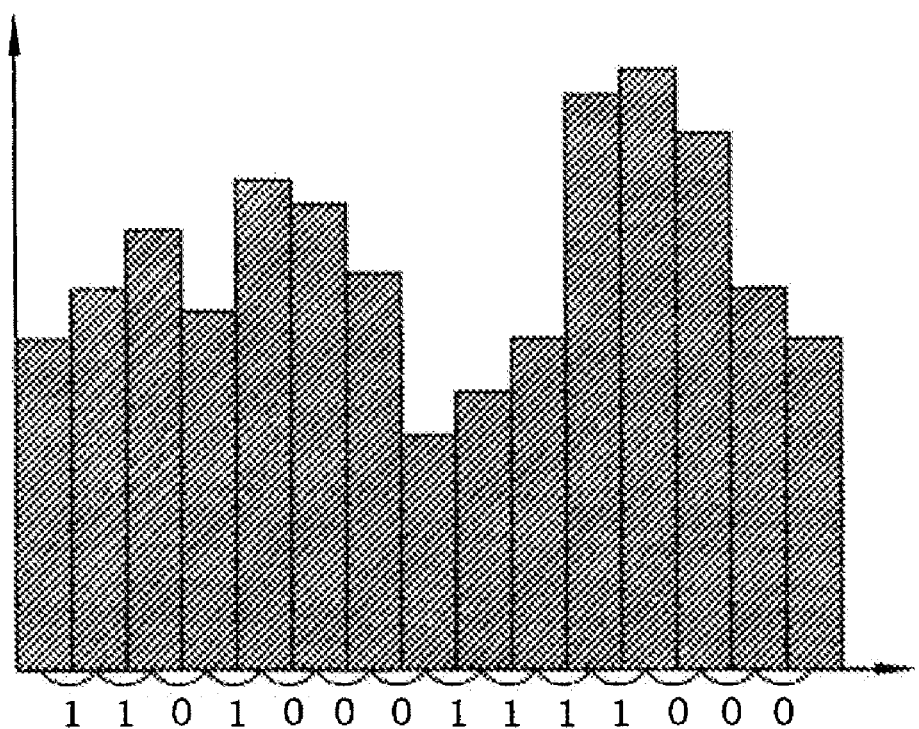
FIG. 5 is a graph obtained by converting all calculated characteristics into bit strings, using a hash function in accordance with an embodiment of the present invention.
Figure 6:
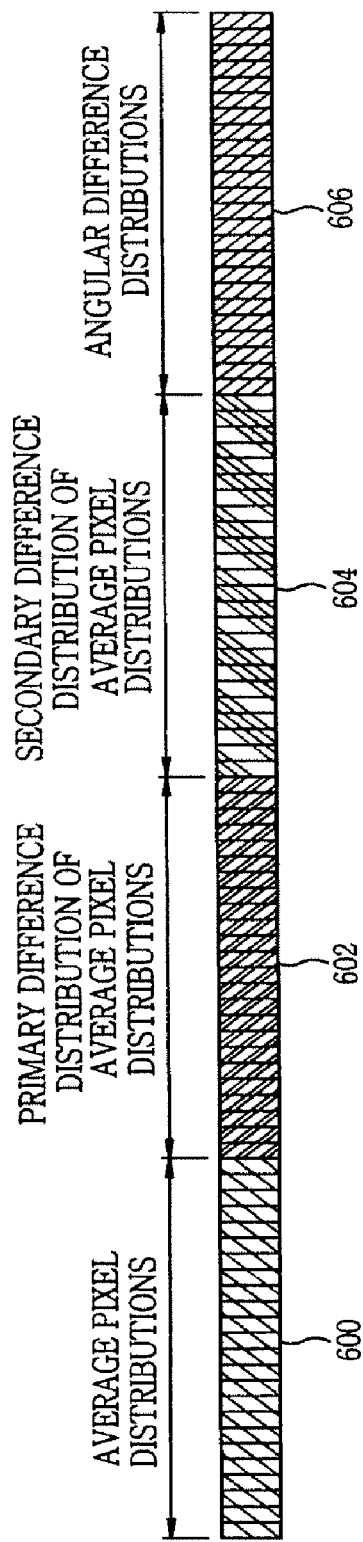
FIG. 6 is a view illustrating a method of integrating bit strings into one integrated bit string in accordance with an embodiment of the present invention.

The characteristics have distributions of predetermined values in the innermost to outermost rings. Starting from the innermost ring, bits of 1 or 0 are allocated to the rings according to the relations with the next ring. FIG. 5 illustrates one example. After the characteristic distributions are converted into the bit strings, the bit strings are integrated into one bit string as shown in FIG. 6. That is, the bit strings are integrated to include an average pixel distribution 600, a primary difference distribution 602 of average pixel distributions, a secondary difference distribution 604 of average pixel distributions, and an angular difference distribution 606.

Thereafter, the average pixel distribution calculating unit 115 repeats the operation of the bit string creating unit 135 by setting the number of rings to 16. Then, the image signature creating unit 140 creates the concentric circle partition based image signature as a final signature by integrating bit strings obtained when the number of rings is 32 and bit strings obtained when the number of rings is 16.

When an original still image is illegally deformed due to a copying thereof or an intended attack thereon or when a natural characteristic of the original still image, such as the size, form, and quality of the original still image, is deformed by the Internet or types of reproduction devices, the original still image and the deformed still image are matched through each image signature. The matching operation of each image signature is to calculate an average hamming distance through exclusive OR (XOR) operations of the signatures in the form of bit strings. As in Equation 6, XOR operations of bits in corresponding positions are performed, and then the average of them is calculated.

MathFigure 6

$$D = \frac{1}{N} \sum_{j=0}^{N-1} R_j \otimes Q_j \quad [\text{Math. 6}]$$

where, N is the total number of bits of each signature and $R_j$ and $Q_j$ are bit values at the j-th position of each signature.

As mentioned above, in accordance with the present invention, a natural signature of a still image is created by partitioning the still image into regions using concentric circles and describing relations between the characteristics of the regions, in order to search for and discriminate the still image even when the still image is illegally deformed due to a copying thereof or an intended attack thereon or when a natural characteristic of the still image, such as the size, form, and quality of the still image, is deformed by the Internet or types of reproduction devices.

In accordance with the present invention, distribution of illegal contents is prevented and interrupted by search for and discrimination of a still image illegally deformed by a copying of and an intended attack on the still image by enabling high speed search for and discrimination of the still image whose natural characteristic may be changed by the Internet or according to types of reproduction devices.

Furthermore, a user can efficiently search for a desired still image in databases containing an enormous amount of still images, image contents distributed in the Internet, or digital photographs stored in a hard disk of the user.

While the invention has been shown and described with respect to the preferred embodiments, it will be understood by those skilled in the art that various changes and modifications may be made without departing from the scope of the invention as defined in the following claims.

The invention claimed is:

1. An image signature creating method comprising:
creating a map by partitioning a still image using rings defined by concentric circles radially spaced apart from each other by a predetermined interval and radial lines circumferentially spaced apart from each other by a predetermined angle, the center of the still image being that of the concentric circles;

creating an image signature from the created map on the basis of a distribution of pixels in regions defined by the rings and the radial lines, wherein creating the image signature comprises:
firstly calculating average distributions of pixels for the rings;
secondly calculating a primary difference distribution of the calculated average distributions;
thirdly calculating a secondary difference distribution using the primary difference distribution; and
fourthly calculating angular difference distributions for the rings;
converting the firstly to fourthly calculated distributions into bit strings; and
creating the image signature by primarily integrating the bit strings.

2. The image signature creating method of claim 1, wherein creating the image signature comprises:
converting the firstly to fourthly calculated distributions into bit strings using a map whose number of rings is reduced to a half and secondarily integrating the hit strings; and
creating the image signature by integrating the primarily integrated bit strings and the secondarily integrated bit strings.

3. The image signature creating method of claim 1, further comprising normalizing the still image by setting the size of the pixels of the still image to a predetermined value before creating a map.

4. The image signature creating method of claim 3, wherein normalizing the still image includes adjusting the size of the pixel on the basis of the shorter one of the width and height of the still image.

5. The image signature creating method of claim 1, wherein fourthly calculating angular difference distributions for the rings comprises:
multiplying the absolute value of an average of pixel differences between a first region in one ring and a second region counterclockwise adjacent to the first region in the ring by the absolute value of an average of pixel differences between the first region and a third region symmetrically opposite to the first region in the ring; and
calculating an average of the values obtained in performing the multiplication of the absolute value for all regions.

6. The image signature creating method of claim 1, wherein converting the firstly to fourthly calculated distributions into bit strings includes converting the firstly to fourthly calculated distributions using a hash function.

7. An image signature creating apparatus comprising:
a map creating unit for creating a map by partitioning a still image using rings defined by concentric circles radially spaced apart from each other by a predetermined radial interval and radial lines circumferentially spaced apart from each other by a predetermined angle, the center of the still image being that of the concentric circles; and
an image signature creating unit for creating an image signature from the created map on the basis of a distribution of pixels in regions defined by the rings and the radial lines, wherein the image signature creating unit comprises:
a first calculation means for calculating average distributions of pixels for the rings;
a second calculation means for calculating a primary difference distribution of the calculated average distributions;
a third calculation means for calculating a secondary difference distribution using the primary difference distribution;
a fourth calculation means for calculating angular difference distributions for the rings; and
a bit string creating means for converting the distributions calculated in the first to fourth calculation units into bit strings and creating an image signature by primarily integrating the bit strings.

8. The image signature creating apparatus of claim 7, wherein the hit string creating means further converts the distributions calculated in the first to fourth calculation means into hit strings using a map whose number of rings is reduced to a half and secondarily integrates the hit strings and creates an image signature by integrating the primarily integrated bit strings and the secondarily integrated hit strings.

9. The image signature creating apparatus of claim 7, further comprising a still image normalization unit for normalizing the still image by setting the size of the pixels of the still image to a predetermined value.

10. The image signature creating apparatus of claim 9, wherein the still image normalization unit adjusts the size of the pixel on the basis of the shorter one of the width and height of the still image.

11. The image signature creating apparatus of claim 7, wherein the fourth calculation means performs an operation of multiplying the absolute value of an average of pixel differences between a first region in one ring and a second region counterclockwise adjacent the first region in the ring by the absolute value of an average of pixel differences between the first region and a third region symmetrically opposite to the first region in the ring; and an operation of calculating an average of the values obtained in the operation of multiplying the absolute value of an average of pixel differences for all regions.

12. The image signature creating apparatus of claim 7, wherein the bit string creating means converts the firstly to fourthly calculated distributions using a hash function.

* * * * *